Patented Oct. 28, 1952

2,615,803

UNITED STATES PATENT OFFICE 2,615,803

HERBICIDAL OIL SOLUTIONS OF SODIUM TRICHLOROACETATE

Howard L. Yowell, Westfield, John F. McKay, Jr., Cranford, and Leo Z. Jasion, Elizabeth, N. J., assignors to Standard Oil Development Company, a corporation of Delaware No Drawing. Application December 22, 1950, Serial No. 202,414

8 Claims. (Cl. 71—2.7)

This invention relates to new and useful improvements in herbicidal compositions. More particularly, this invention relates to homogeneous stable solutions of sodium trichloroacetate in compositions containing both water and oil.

Sodium trichloroacetate is a known herbicidal chemical. It is an extremely useful contact herbicide which is normally used in aqueous solutions to kill weeds and particularly grasses in non-crop lands such as ditchbanks, headlands, industrial areas, etc., by blanket application. It also has utility in cultivated areas by the use of spot or limited treatments. Sodium trichloroacetate is a dusty, pungent powder which is extremely irritating to skin and eyes. It thus involves certain dangers and inconveniences to the handler when it is made up into aqueous solutions for spray application.

The use of aromatic petroleum oils as weed killers is also well known in the art. Application of a chemical weed killer as a solution in a petroleum oil entails certain advantages such as (a) the "sticking" qualities of the herbicide are improved, (b) rainfall has less tendency to wash off the weed killer, thus increasing residual activity, (c) penetration of the weed killer through the waxy surfaces of the noxious weeds and grasses is enhanced by the presence of oil and (d) lower gallonage applications are possible, which means less bulky material must be transported to the field.

It is therefore desirable to combine the useful properties of sodium trichloroacetate with those of the aromatic oils and thus also eliminate the undesirable features of sodium trichloroacetate itself. This is difficult to achieve, however, because of sodium trichloroacetate's extremely low solubility in aromatic oils and other organic solvents; e. g., less than 0.5 wt. % in methyl ethyl ketone and less than 0.01% in hydrocarbon oils. Addition of emulsifying agents in a random manner to compositions containing aromatic oils, water, and sodium trichloroacetate do not give very stable emulsions probably because of the presence of the sodium trichloroacetate salt. The separation of the components of compositions of this nature into distinct phases and, in some cases, the precipitation of sodium trichloroacetate out of solution is undesirable for several reasons. Metallic containers are corroded by the separated aqueous phase. Precipitated sodium trichloroacetate is difficult to get back in solution and is especially difficult to handle where the compositions have to be additionally formulated after shipment and prior to their use in sprays.

It has now been found that sodium trichloroacetate can be incorporated into a clear homogeneous stable solution containing both aromatic petroleum oil and water. These compositions, therefore, do not suffer from any of the above-listed difficulties of the prior art oil-and-water compositions or of the sodium trichloroacetate itself but do secure all the advantages accruing from the presence of the petroleum oil. As a matter of fact, the solutions of this invention result in more herbicidal activity than other compositions containing equivalent amounts of sodium trichloroacetate and aromatic petroleum oils. A synergistic action is obtained. These results are completely unexpected and novel because the sodium trichloroacetate is virtually insoluble in any of the components of the compositions of this invention except the water itself.

The individual components of the multi-component homogeneous stable solution compositions of this invention and the quantities utilized are listed directly below. These proportions are quite critical and must be kept within certain limits or unstable solutions result and the sodium trichloroacetate precipitates out of solution.

Sodium trichloroacetate itself, as previously stated, is a well-known chemical herbicide. Its preparation and properties are well known. It is utilized in the compositions of this invention in an amount of from 6.7 to 16.65 wt. %. While smaller quantities can be utilized, such a use is completely uneconomic because the stable solutions of this invention are especially adapted for economy in transportation and are designed to be diluted, if desired, subsequently at the site of use.

The aromatic petroleum oils employed are the well-known cracked and uncracked oils conventionally utilized for herbicidal purposes (see e. g., California Agricultural Extension Service Publication, Circular 137, July 1947, pp. 12–16). It is desired that these oils have a minimum aromatic content of 35 wt. %, and a boiling point in the range of 325°–600° F.

The aromatic extracts of kerosene particularly utilized in the compositions of this invention are prepared by well-known processes of extracting aromatics from kerosene, e. g., extracting kerosene with liquid sulfur dioxide and evaporating the sulfur dioxide from the extract phase or extracting the aromatics with phenol and stripping the phenol from the extract phase. The aromatic extracts of kerosene employed boil predominantly in the range of 325°–600° F., and have an aromatic content of between 83% and 98 wt. %.

Typical inspections are as follows, where A is an aromatic extract of kerosene and B is a catalytically cracked petroleum cycle stock:

|  | A | B |
|---|---|---|
| Specific Gravity | 0.89 | .87 |
| A. S. T. M. Dist., ° F.: |  |  |
| I. B. P | 325 | 406 |
| F. B. P | 580 | 580 |
| Mixed Aniline Point, ° F | 81 | 135 |
| Flash Point, ° F | 140 | 190 |
| Percent Aromatics | 85 | 35 |

It should be noted that low aromatic petroleum oils, e. g., those containing less than 30% aromatics, do not produce clear solutions at the concentrations of sodium trichloroacetate employed. The aromatic oils utilized in this invention are present in an amount of from 32.7 to 69.0 weight per cent.

Water-soluble emulsifying agents are utilized in an amount of from 4.65 to 9.3 weight per cent. Among the water-soluble emulsifying agents that can be used are the sulfates of medium chain alcohols such as up to about dodecanol, sulfonated amide and ester derivatives, lower molecular weight sulfonated aromatic and mixed alkyl-aryl sulfonate derivatives and esters of fatty acids such as the ricinoleic acid ester of sorbitol. The non-ionic emulsifying agents such as the ethylene oxide condensation products of alkylated phenols may be used. Mixtures of these emulsifying agents may also be employed. Particularly desirable and effective agents in the compositions of this invention are the polymerized alkylated phenol polyethylene oxide condensation product known commercially as Igepal CA and the dioctyl ester of sodium sulfosuccinic acid known commercially as Aerosol OT.

Oil-soluble emulsifying agents are employed in an amount of from 9.76 to 18.55 weight per cent. Among the oil-soluble wetting agents are the higher molecular weight alkyl-aryl sulfonate derivatives such as the higher petroleum sulfonates, lanolin derivatives, etc. (see "Synthetic detergents—up to date," Soap and Sanitary Chemicals, August, September, and October 1949). Particularly effective and desirable agents are the 50% active sodium petroleum sulfonates having a molecular weight of 465–480 known as Acto 500 and alkanolamine higher fatty acid esters. The alkanolamine portions of the esters are illustrated by triethanolamine, monoethanolamine, mixed isopropanolamine and diethylethanolamine. Triethanolamine is particularly effective and desirable. Higher fatty acids of preferably $C_{12}$ to $C_{20}$ length form the acid components of the ester. Particularly effective and desirable is oleic acid. The alkanolamine higher fatty acid ester can be formed in situ by utilizing the higher fatty acid and the alkanolamine individually in the compositions of this invention and allowing them to react for about 30 minutes. In that case the percentages of the alkanolamine and the higher fatty acid are determined from the ranges given.

It should be understood that the same chemical type emulsifying agents can be either water or oil-soluble depending upon the molecular weights and individual components. The skilled person in the art will have no difficulty in choosing water and oil-soluble emulsifying agents from the information supplied and the extensive literature available (see "Synthetic detergents—up to date," Soap and Sanitary Chemicals, August, September, and October 1949).

It is to be understood that the term, "solution," as used herein and in the claims, is intended as a word of limitation as it may conceivably be possible to select extremes of the ranges of the individual components and not get a homogeneous solution. As far as is known, however, these specified ranges give the proper quantities of materials to result in the desired stable solution compositions.

The stable solutions of this invention can be prepared in general by mixing together the water-soluble emulsifying agent, the oil-soluble emulsifying agent and then dissolving this system in the aromatic petroleum oil. The sodium trichloroacetate is dissolved in the water with slight warming. The warm aqueous solution of sodium trichloroacetate is then added, with stirring, to the aromatic oil solution of the emulsifier. This results in a clear, amber colored single phase homogeneous stable solution.

The compositions of this invention may be readily diluted with water to form emulsions for use in field application. The solutions may also be diluted with herbicidal oils, e. g., fuel or diesel oil, to form emulsions for similar use where it is desirable to have a higher concentration of oily components. These factors make the solutions of this invention extremely convenient for shipping and handling. The quantities of solution utilized with these additional components varies with economic considerations, e. g., manpower available, price of oil, etc., and the weed incidence.

The following examples illustrate this invention and indicate test results obtained on the compositions of this invention.

EXAMPLE I

*Preparation of a soluble composition*

6.5 gms. of Igepal CA, 6.83 gms. of oleic acid and 2.93 gms. of triethanolamine were mixed together and allowed to react for 30 minutes. This emulsifier was then dissolved in 32.7 gms. of an aromatic extract of kerosene containing 83–98% aromatics. 16.34 gms. of commercial sodium tricholoracetate were dissolved in 34.7 gms. of water. The warm aqueous solution of sodium tricholoracetate was added with stirring to the aromatic oil solution of the emulsifier. A clear, amber colored, stable solution was produced.

EXAMPLE II

Various soluble compositions were prepared and their formulations are listed below.

*Composition of stable oil solutions of commercial sodium trichloroacetate*

| Composition No. | Wt. Percent Emulsifier a | | Aromatic Petroleum Oil,b Wt. Percent | Commercial Sodium Trichloroacetate, Weight Percent | Water, Wt. Percent |
|---|---|---|---|---|---|
| | Oil Soluble | Water Soluble | | | |
| (1) | a10.3—D | a6.9—A | 69.0 | 6.9 | 6.9 |
| (2) | 11.2—D | 7.5—A | 62.5 | 9.4 | 9.4 |
| (3) | 12.1—D | 8.1—A | 58.0 | 10.9 | 10.9 |
| (4) | 12.95—D | 8.65—A | 54.0 | 12.2 | 12.2 |
| (5) | 13.5—D | 9.0—A | 50.0 | 13.75 | 13.75 |
| (6) | 13.9—D | 9.3—A | 46.5 | 15.15 | 15.15 |
| (7) | 10.0—D | 6.65—A | 33.35 | 16.65 | 33.35 |
| (8) | 9.76—D | 6.5—A | 32.7 | 16.34 | 34.7 |
| (9) | 18.55—C | 4.65—A | 46.5 | 10.3 | 20.0 |
| (10) | 17.85—C | 5.95—A | 47.6 | 9.5 | 19.1 |
| (11) | 17.5—C | 7.5—A | 50.0 | 8.3 | 16.7 |
| (12) | 16.0—C | 5.3—A, 5.3—B | 53.3 | 6.7 | 13.4 | a Code for emulsifiers:
A = polymerized alkylated phenol polyethylene oxide condensation product known commercially as Igepal CA.
B = dioctyl ester of sodium sulfosuccinic acid known commercially as Aerosol OT.
C = 50% active sodium petroleum sulfonate of 465–480 molecular weight known commercially as Acto 500.
D = mixture of 70 weight percent oleic acid, 30 weight percent triethanolamine.
b Aromatic extract of kerosene containing 83–98 weight percent aromatics.

EXAMPLE III

The composition No. 8, Example II, was tested as an eradicant for Johnson grass. These Johnson grass seedlings were 2 to 10 inches tall at the time of treatment. Two weeks later the surviving seedlings in a total of 1 square yard per treatment were counted. The small new Johnson grass seedlings in 3 square yards per treatment were counted approximately 4 weeks after the treatment was applied. These data are presented below along with data on other sodium trichloroacetate formulations which were included in the field test for comparative purposes. The data in this table are arranged with the most effective compositions listed in order. It may be seen that application of sodium trichloroacetate as described in this invention and diluted with heavy marine diesel oil gave complete kill of existing Johnson grass and also gave the best residual control of new Johnson grass plants. These results were superior to those achieved with the same or greater amounts of sodium trichloroacetate applied either as an aqueous solution or as an aqueous emulsion in heavy marine diesel oil.

*Total number of Johnson grass seedlings growing in plots treated with sodium trichloroacetate herbicides*

| Herbicides and Rate per Acre | Johnson Grass | |
|---|---|---|
| | Surviving per sq. yd. 2 wks. after treatment | New Plants per 3 sq. yds. 4 wks. after treatment |
| 12 lbs. Composition (8)1 + 10 gal. HMD 2 | 0 | 3 |
| 12 lbs. Sodium trichloroacetate 3 | 6 | 7 |
| 8 lbs. Sodium trichloroacetate + 10 gal. HMD 2 | 3 | 11 |
| Check plot | 17 | 11 |
| 12 lbs. Sodium trichloroacetate + 10 gal. HMD 2 | 7 | 13 |
| 8 lbs. Sodium trichloroacetate 3 | 9 | 23 |

1 Expressed as pounds of commercial sodium trichloroacetate.
2 Heavy marine diesel oil.
3 Applied as an aqueous solution.

In some cases Oxo bottoms products produced by the well-known two-stage process for making Oxo alcohols can supplant, to a certain extent, the aromatic petroleum oils.

The compositions of this invention may most advantageously be applied as sprays with conventional spraying equipment.

Diverse weeds such as the following are effectively treated by the compositions of this invention:

Knotweed (*Polygonum aviculare*)
Bluegrass, annual (*Poa annua*)
Crab grass (*Digitaria sp.*)
Yarrow (*Achillea millefolium*)
Onion, wild (*Allium sp.*)
Plantain, broad-leaf (*Plantago major*)
Speedwell or veronica (*Veronica sp.*)
Strawberry, false (*Duchesnea indica*)
Plaintain, buckhorn or narrow-leaf (*Plantago lanceolata*)
Nimblewill, or bush muhly (*Muhlenbergia schreberi*)
Chickweed, mouse-ear (*Cerastium sp.*)
Bugleweed (*Ajuga reptans*)
Heal-all (*Prunella vulgaris*)
Gill-over-the-ground or ground ivy (*Nepeta hederacea*)
Pennywort (*Hydrocotyle rotundifolia*)
Chickweed, common (*Stellaria media*)
Plantain, Rugel's (*Plantago rugelii*)
Sorrel, wood (*Oxalis sp.*)
Moneywort (*Lysimachia nummularia*)
Vervain, prostrate (*Verbena bracteosa*)
Purslane, milk or spotted spurge (*Euphorbia maculata*)
Sorrell, red or sheep (*Rumex acetosella*)
Paspalum (*Paspalum sp.*)
Henbit (*Lamium amplexicaule*)
Goosegrass (*Eleusine indica*)
Dandelion (*Taraxacum officinale*)
Buttercup (*Ranunculus sp.*)
Clover, white (*Trifolium repens*)
Medic, black or yellow trefoil (*Medicago lupulina*)
Johnson grass (*Holcus halepensis*)

This invention has been described with respect to specific embodiments but is not to be limited thereby except as indicated in the appended claims.

What is claimed is:

1. A herbicidal composition comprising a stable homogeneous solution having approximately the following weight percent composition:

| | |
|---|---|
| Mixture of 70 weight percent oleic acid, 30 weight percent triethylanolamine | 9.76 |
| Polymerized alkylated phenol polyethylene oxide | 6.5 |
| Aromatic petroleum oil | 32.7 |
| Sodium trichloroacetate | 16.34 |
| Water | 34.7 |
| | 100.00 |

2. A herbicidal composition comprising a stable homogeneous solution having approximately the following weight per cent composition:

| | |
|---|---|
| Sodium petroleum sulfonate of 465 to 480 molecular weight | 17.5 |
| Polymerized alkylated phenol polyethylene oxide | 7.5 |
| Aromatic petroleum oil | 50.0 |
| Sodium trichloroacetate | 8.3 |
| Water | 16.7 |
| | 100.0 |

3. A herbicidal composition comprising a stable homogeneous solution of sodium trichloroacetate in an amount of 6.7 to 16.65 weight per cent; 32.7 to 69 weight per cent of an aromatic petroleum oil boiling in the range of 325°–600° F. and having a minimum aromatic content of 35 weight per cent; 9.76 to 18.55 weight per cent of an oil-soluble emulsifying agent; 4.65 to 9.3 per cent of a water-soluble emulsifying agent; and 6.9 to 34.7 weight per cent water.

4. The composition of claim 3 in which the water-soluble emulsifying agent is a polymerized alkylated phenol polyethylene oxide and the oil-soluble emulsifying agent is a sodium petroleum sulfonate of 465 to 480 molecular weight.

5. The composition of claim 3 in which the water-soluble emulsifying agent is a polymerized alkylated phenol polyethylene oxide and the oil-soluble emulsifying agent is an alkanolamine higher fatty acid ester.

6. The composition of claim 3 in which the water-soluble emulsifying agent is a dioctyl ester of sodium sulfosuccinic acid and the oil-soluble emulsifying agent is a sodium petroleum sulfonate of 465 to 480 molecular weight.

7. The composition of claim 3 in which the water-soluble emulsifying agent is a dioctyl ester of sodium sulfosuccinic acid and the oil-soluble emulsifying agent is an alkanolamine higher fatty acid ester.

8. The composition of claim 3 in which the aromatic petroleum oil is an aromatic extract of kerosene having an aromatic content of from between 83 and 98 weight per cent.

HOWARD L. YOWELL.
JOHN F. McKAY, Jr.
LEO Z. JASION.

REFERENCES CITED

The following references are of record in the file of this patent:

UNITED STATES PATENTS

| Number | Name | Date |
|---|---|---|
| 2,393,086 | Bousquet | Jan. 15, 1946 |